(12) United States Patent
Nagao

(10) Patent No.: US 7,853,532 B2
(45) Date of Patent: Dec. 14, 2010

(54) INFORMATION PROCESSING APPARATUS AND METHOD, AND DATA COMMUNICATION SYSTEM AND METHOD

(75) Inventor: Yutaka Nagao, Chiba (JP)

(73) Assignee: Sony Corporation, Tokyo (JP)

( * ) Notice: Subject to any disclaimer, the term of this patent is extended or adjusted under 35 U.S.C. 154(b) by 272 days.

(21) Appl. No.: 11/958,429

(22) Filed: Dec. 18, 2007

(65) Prior Publication Data

US 2008/0098384 A1     Apr. 24, 2008

Related U.S. Application Data

(62) Division of application No. 10/972,455, filed on Oct. 26, 2004.

(30) Foreign Application Priority Data

Nov. 5, 2003   (JP)   ............................. 2003-376112

(51) Int. Cl.
    *G06F 21/00* (2006.01)
(52) U.S. Cl. ............................. 705/59; 705/51; 705/52; 705/67; 726/26; 713/153
(58) Field of Classification Search ............ 705/51–59, 705/67; 726/26; 713/153
    See application file for complete search history.

(56) References Cited

U.S. PATENT DOCUMENTS

| | | | | |
|---|---|---|---|---|
| 7,010,808 | B1 * | 3/2006 | Leung et al. | 726/26 |
| 7,165,174 | B1 * | 1/2007 | Ginter et al. | 713/153 |
| 7,260,556 | B2 * | 8/2007 | Stefik | 705/52 |
| 7,395,245 | B2 * | 7/2008 | Okamoto et al. | 705/59 |
| 2003/0140009 | A1 * | 7/2003 | Namba et al. | 705/59 |
| 2005/0049976 | A1 * | 3/2005 | Yang | 705/67 |
| 2005/0144140 | A1 | 6/2005 | Nagao | 705/59 |
| 2006/0089912 | A1 * | 4/2006 | Spagna et al. | 705/51 |

* cited by examiner

*Primary Examiner*—Pierre E. Elisca
*Assistant Examiner*—Shahid Kamal
(74) *Attorney, Agent, or Firm*—Oblon, Spivak, McClelland, Maier & Neustadt, L.L.P.

(57) ABSTRACT

A client obtains license information. The client has a client module for using content under conditions defined in the license information. When the client module is updated and a new function is added, the client obtains updating license information including permission of the new function. The client is allowed to use the content under the conditions defined in the previous license information and the conditions defined in the updating license information without obtaining new rights information for the updated client module.

8 Claims, 9 Drawing Sheets

FIG. 7

Data Name

---

VERSION INFORMATION

Usage Right Type

CID

UsageRight Disjunction Rules

Leaf ID

Device and Media Categories for Check Out

Check Out Max Count

Device and Media Categories for copy

Copy Max Count

AT3CD Burn Max Count start_time end_time period_time

INFORMATION PROCESSING APPARATUS AND METHOD, AND DATA COMMUNICATION SYSTEM AND METHOD

CROSS REFERENCE TO RELATED APPLICATIONS

This application is a divisional of U.S. patent application Ser. No. 10/972,455 filed on Oct. 26, 2004, all of which claim priority to Japanese Patent Application No. 2003-376112 filed on Nov. 5, 2003. The contents of each of these documents are incorporated herein by reference.

BACKGROUND OF THE INVENTION

1. Field of the Invention

The present invention relates to an information processing apparatus and method for allowing content licensed by a copyright owner to be used under a range of conditions described in license information. The present invention further relates to a data communication system including the information processing apparatus and a license issuing server, and to a data communication method.

2. Description of the Related Art

Commercial services for purchasing digital content, such as music and video, over a network, such as the Internet, have become widely available. For example, with electronic music distribution (EMD) services over the Internet, users can download digital music content and can store it in a client terminal or a personal computer to enjoy the content on the personal computer.

The personal computer initiates a music recording and playback application including a certain copyright protection technology under an operating system (OS), and stores a content file including encrypted digital content and a rights information file including conditions for the digital content in a storage device, such as a hard disc drive (HDD), thus realizing a highly secure service.

Japanese Unexamined Patent Application Publication No. 14-359616 discloses an information processing apparatus in which a music recording and playback application including a certain copyright protection technology prevents content from being illegally used without impeding distribution of the content.

In DRM (Digital Right Management) services of the related art for purchasing digital content, such as music and video, over a network, such as the Internet, for example, a content file including encrypted digital content and a rights information file including conditions for the digital content are separately provided, thus realizing high-security EMD services. In such services, the specification of rights information files of digital content is defined depending upon the function currently available on a client module for using the content.

When the client module is updated, a new function becomes available. However, the user who has a previous rights information file cannot utilize the new function of the updated client module because the previous license does not support the new function. Thus, users are demanded to purchase a new license each time the module is updated.

It is therefore convenient to both a content provider and a content user that a rights information file owned by the user be updated when a client module is updated.

SUMMARY OF THE INVENTION

Accordingly, it is an object of the present invention to provide an information processing apparatus and method for allowing content to be used based on a new function that is added when a client module for using the content is updated, and to provide a data communication system and method.

In one aspect, the present invention provides an information processing apparatus for using content under condition information defined in license information. The apparatus includes an executing module for obtaining license information including condition information for at least one usage function, and using the content under the condition information defined in the obtained license information. When the executing module is updated by an updating module to add a usage function and the condition information defined in the license information obtained before the executing module is updated does not include condition information for the added usage function, the executing module obtains updating license information including the condition information for the added usage function, and uses the content under the condition information defined in the updating license information and the condition information defined in the license information obtained before the executing means is updated.

When the executing module is updated and a new usage function is added, a user having previous license information that does not include condition information for the new usage function obtains updating license information. Then, the user is allowed to use content under the condition information defined in the updating license information and the previous license information. The user can therefore use the content based on the new usage function.

The executing module may have a version number according to at least one usage function that can be used in the executing module. The license information may include version information indicating a version of the executing module, and condition information for a usage function that can be used in the version of the executing module. With the license information associated with the version of the executing module, when the version information and the version of the executing module are not matched, e.g., when the executing module is updated, an updating license including condition information for a new usage function is obtained so that the license information can support the updated executing module.

The updating license information may include additional condition information for the added usage function, and target-version information specifying a version of the executing module that requires the additional condition information. Thus, the executing module can recognize license information having target-version information identical to the version information of the obtained license information to be updating license information.

Condition information defined in the license information obtained before the executing module is updated may include a permission condition for permitting use of the usage function, and a usage condition for the permitted usage function. The updating license information may specify a permission condition for permitting use of the added usage function. Thus, the usage condition defined in the previous license information can be enforced on the new usage function.

The executing module may obtain the updating license information using the updating module. Therefore, the executing module can be updated using the updating module, and an updating license defining usage conditions for an usage function added by updating can be obtained.

The information processing apparatus may further include a communicating unit that obtains information including the updating module via a network. The executing module may be updated using the updating module obtained via the communicating unit. For example, the updating module may be downloaded via the Internet.

In another aspect, the present invention provides an information processing method for an information process apparatus that uses content under condition information defined in license information. The method includes a license obtaining step of obtaining license information including condition information for at least one usage function to use the content, and an executing step of using the content in an executing module for using the content under the condition information defined in the license information obtained in the license obtaining step. When the executing module is updated by an updating module to add a usage function and the condition information defined in the license information obtained in the license obtaining step before the executing module is updated does not include condition information for the added usage function, the executing step obtains updating license information including the condition information for the added usage function, and uses the content under the condition information defined in the updating license information and the condition information defined in the license information obtained in the license obtaining step.

In another aspect, the present invention provides a data communication system for communicating data between a communication terminal and a server connected with the communication terminal via a network. In the data communication system, the server includes a license information issuing unit that issues license information to the communication terminal, the license information including condition information for at least one usage function to use content. The communication terminal includes an executing module for obtaining the license information and using the content under the condition information defined in the obtained license information. When the executing module is updated by an updating module to add a usage function and the condition information defined in the license information obtained before the executing module is updated does not include condition information for the added usage function, the license information issuing unit issues updating license information including the condition information for the added usage function. The executing module obtains the updating license information, and uses the content under the condition information defined in the updating license information and the condition information defined in the obtained license information.

In the present invention, a communication terminal includes an executing module for using content, and uses the content using the executing module under obtained license information. When the executing module is updated and a new function is added, the license obtained before the executing module is updated does not include condition information for the new function. The communication terminal obtains updating license information for the new function to obtain license information for the difference function added by updating. Thus, the content can be used under the usage function that is not included in the previous license information. The server does not need to update the license information of the communication terminal so that the new function can become available each time the executing module is updated. Therefore, the amount of processing for updating the executing module can be reduced.

In another aspect, the present invention provides a data communication method for communicating data between a communication terminal and a server connected with the communication terminal via a network. The communication terminal is allowed to use content under condition information defined in a license. The server issues license information to the communication terminal, the license information including condition information for at least one usage function to use the content. The method includes a license information issuing step of issuing the license information from the server to the communication terminal, a license obtaining step of obtaining the license information in the communication terminal, and an executing step of using the content in an executing module of the communication terminal under the condition information defined in the obtained license information. When the executing module is updated by an updating module to add a usage function and the condition information defined in the license information obtained in the license obtaining step before the executing module is updated does not include condition information for the added usage function, the license information issuing step issues updating license information including the condition information for the added usage function. The executing step obtains the updating license information, and uses the content under the condition information defined in the updating license information and the condition information defined in the license information obtained in the license obtaining step.

According to the present invention, therefore, an executing module for using content is updated in an information processing apparatus. If a new usage function for which condition information is not defined in previous license information is added, updating license information including the condition information for the new usage function is obtained. Thus, the information processing apparatus is allowed to use the content based on the new usage function that is not defined in the previous license information. It is not necessary for a server that provides license information to update the issued license information of clients so that the new function can become available and to reissue the updated license information each time the executing module is updated. Thus, the amount of processing to be performed for updating the executing module can be reduced.

BRIEF DESCRIPTION OF THE DRAWINGS

FIG. 7 is a configuration diagram of a rights file;

DESCRIPTION OF THE PREFERRED EMBODIMENTS

Figure 1:
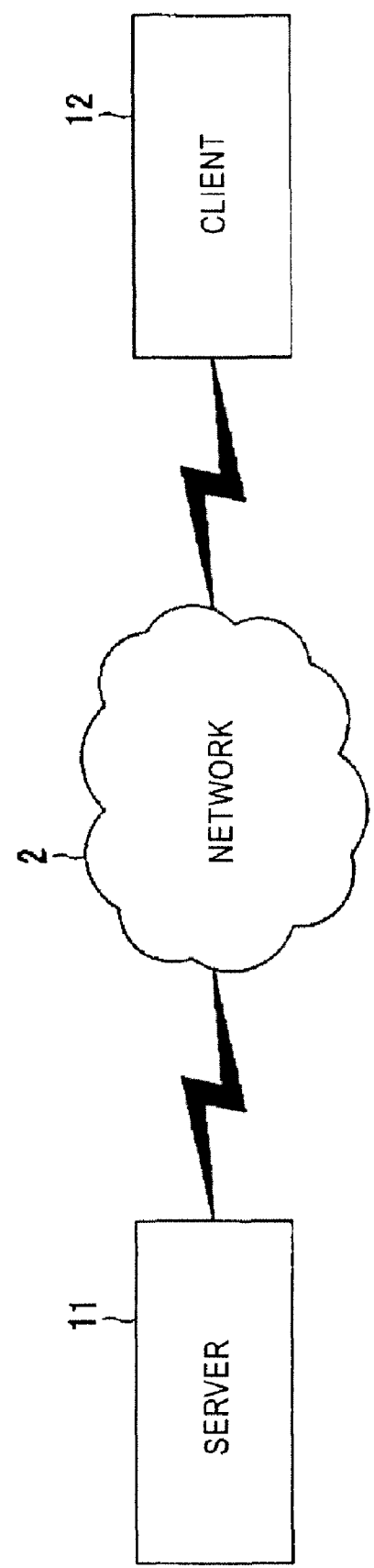
FIG. 1 is a block diagram of a content providing system according to an embodiment of the present invention.

A content providing system according to an embodiment of the present invention will be described in detail with reference to the drawings. The content providing system is constituted by a communication terminal (hereinafter referred to as a "client") and a server. The client obtains rights information (or license information) including content usage conditions under which the content can be used. The server issues a license.

Generally, an information processing apparatus for using the content on the client side initiates an executing module including a predetermined copyright protection technology, e.g., a music recording and playback application, under an OS. Then, a content file including encrypted digital content, and a rights information file including conditions for the digital content are stored in a storage device, such as an HDD. The content can be used in the music recording and playback application.

A content executing module, such as a music recording and playback application, is updated at predetermined times, and new functions are added. The server, such as a content provider that issues licenses, issues license information supporting the functions available in the executing module. When the executing module is updated and a new function is added, the server issues new license information that supports the new function available in the updated executing module.

The new function may be a function of checking out the content from the client to other devices (checkout devices), or a function of recording the content onto recording media. For example, the executing module is updated to support the new function when new recordable recording media or new checkout devices are commercially available. The license information issued before the executing module is updated does not include conditions for the new function, and new license information including the conditions for the new function is issued by a license issuer. A client that does not have license information including the conditions for the new function cannot utilize the new function even if the client updates the executing module and adds the new function.

The license issuing server often desires to provide license information including a service of allowing content to be checked out or copied free of charge to any available checkout device or copy-allowed recording medium to a client that purchases the content, although the client may be billed for the number of times the content was checked out or copied. A client having a checkout function indicating, e.g., five checkouts allowed often desires to enforce this checkout function also on a new checkout device Y added to the checkout devices defined in an updated checkout function. If the previous checkout function defines a checkout device X as only one checkout device, the five-checkout usage condition is not applied to the device Y.

In such cases, if clients' license information for an updated executing module is updated by the server, a heavy load is placed on the server, which is not practical. All clients that are to use the content generally have an executing module, and clients often have a plurality of licenses for each content item. Thus, the server must update a large volume of license information. It is also time-consuming for a client having a plurality of licenses to return the licenses to the server for updating them each time the executing module is updated.

In this embodiment, a new function added in an updated executing module can be utilized without updating the license information each time the executing module is updated. The added new function can be utilized with the previous license information equivalently with new license information purchased when the executing module is updated.

In the following description, a function of checking out content to a device A or B is referred to as a "usage function" for the content; in particular, a function of checking out content to a designated device is referred to as a usage function of the designated device. A condition for permitting checkout (usage function) to a device A is hereinafter referred to a "checkout permission condition". The checkout permission condition includes a condition specifying the number of times the content can be checked out, and this condition is referred to as a "checkout condition" to identify it from the checkout permission condition. The usage function may include a function of checking content to a designated device, a function of recording content onto a designated recording medium (also in this function, a different usage function is set depending upon the type of recording medium), etc. The recording permission condition for recording onto a recording medium includes recording condition specifying the number of times the content can be recorded.

FIG. 1 is a block diagram of a content providing system 1 according to the present invention. The content providing system 1 handles video and/or audio data (content). A server 11 is connected to a client 12 via a network 2, such as the Internet. Although one client 12 is shown in FIG. 1, any number of clients 12 may be connected to the network 2.

In the content providing system 1, the client 12 downloads the content from the server 11, and obtains a rights information file including license information of the content in order to use the content.

The client 12 is an information processing apparatus that is allowed to use the content under a range of conditions described in the license information. The client 12 includes a communication unit for obtaining content and a rights information file. The rights information file includes license information defining conditions of the content. The client 12 further includes a client module serving as an executing module for executing various usage functions to use the content.

The client 12 registers itself in the server 11 in advance, and obtains service data including an identification ID for identifying the client 12, a private key and public key pair of the client 12, a public key of the license server, and certificates of the public keys. Using the service data, the client 12 downloads the content and safely obtains license information. Then, the client 12 can use the content. The content, the license, and the client module may be simultaneously or separately obtained.

In this embodiment, the client module is application software for audibly or visually using music content or video content such as a movie. The client module has a version number according to an available usage function for the content. The usage function for the content may be a function of checking out the content to a portable device (PD), or a function of recording the content onto another recording medium.

The license information required for using the content includes conditions for various usage functions of the client module. The license information is stored in a rights information file, and the rights information file includes version information complying with the specification of describable license information.

In this embodiment, therefore, the client module has a version number according to a usage function available in each version of the client module. The license information includes version information indicating which version of the client module the conditions defined in the license information support.

In this embodiment, the module of the client 12 provides processing in accordance with a rights information file. In the future, when a new usage function is added to the client module, that is, when the client module is updated and a new usage function (or new function) becomes additionally available in the client module, the description corresponding to the new function is also added to the rights information file, and the version information in the rights information file is updated. Therefore, a client having the client module that supports the new function and that includes the license information indicating previous version information, that is, a client having the client module that includes only a rights information file including no permission conditions for the added new function can utilize the new function. In this case, the client obtains updating license information that includes permission conditions for permitting use of the content based on the new function.

The license information includes version information indicating the version of the client module, permission conditions for usage functions available in each version of the client module, and usage conditions for the usage functions. The permission conditions include a checkout permission condition for permitting checkout of downloaded content from the client to another device, such as a portable device (PD), a transfer permission conditions for permitting transfer of license information to another terminal, and a recording permission condition for permitting recording onto a predetermined recording medium. For example, version 1 of the client module has a usage function of checking out content to HD players, version 2 of the client module has a usage function of checking out the content also to personal digital assistants (PDAs), and version 3 of the client module has a usage function of checking out the content also to car stereo systems. In this case, the functions of checkout to PDAs and car stereo systems are added when the client module is updated. The license information includes version information indicating these versions of the client module, and permission conditions for the new functions.

In this embodiment, a new function is added to the client module by updating software. Not only software but also hardware may be added as a new function. For example, in addition to a function of checkout to PDs, a new function of recording onto CD-R (Compact Disc-Recordable) or CD-RW (Compact Disc-Rewritable) disks may be added by adding hardware, e.g., a recording device such as a CD-R or CD-RW drive, to the client 12.

A new function may be added to the client module using an updating module for updating an existing client module to a new client module (e.g., a new client module having an updating function). A content provider may distribute the updating module via a network, such as the Internet, or may sell (distribute) or offer a recording medium having the updating module recorded therein. If the client module is updated only in software, an existing module of the client 12 may be updated using the updating module. If a new function is added due to hardware expansion, hardware and software may be updated.

When a version of the module of the client 12 is updated and a new function is added, the rights information in the existing license information obtained prior to the updating does not include a permission condition and a usage condition for the new function. Therefore, the user who updated the client module is not allowed to utilize the new function.

In this embodiment, as described above, the rights information file includes version information associated with each version of the client module. The updating module includes an updating rights file. For example, the updating rights file includes a permission condition for a new function of the updated version of the client module, and version information indicating a previous version of the client module that requires the permission condition for the new function (hereinafter referred to as "target-version information"). The updating rights file is stored in a new version of the client module. When the module is updated, the client 12 obtains the updating license information at the same time, and is allowed to use the content under the permission condition for the new function described in the updating license information. The client 12 is therefore allowed to use the content based on the new function without obtaining a new rights information file each time the client module is updated.

The updating license information may be downloaded by the user via the Internet from the server 11 that provides content and license information.

When a checkout usage function is updated, e.g., when the number of checkout devices increases, the checkout condition, or the number of times checkout can be performed, is also enforced on the updated usage function. For example, a client having license information indicating one checkout allowed can also enforce the "one checkout allowed" rights on the new checkout device or devices, and can check out the content one time to the new checkout device or devices.

The server 11 shown in FIG. 1 transmits content, a license, etc., to the client 12 in response to a request from the client 12. The server 11 also transmits an updating module for updating the client module, or updating license information for an updated module, if necessary, or when an updated version of the client module becomes available. The server 11 may further bill the client 12 for the license.

If new license information including conditions for a new function is issued or a rights information file for a previous version of the client module is updated each time the client module is updated, a heavy load is placed on the server 11. In this case, the server 11 must update rights information files of all users who use the client module, which is not practical. In this embodiment, updating license information or an updating module having the updating license information stored therein is distributed. Thus, the amount of processing to be performed by the server 11 for updating the client module is reduced.

Figure 2:
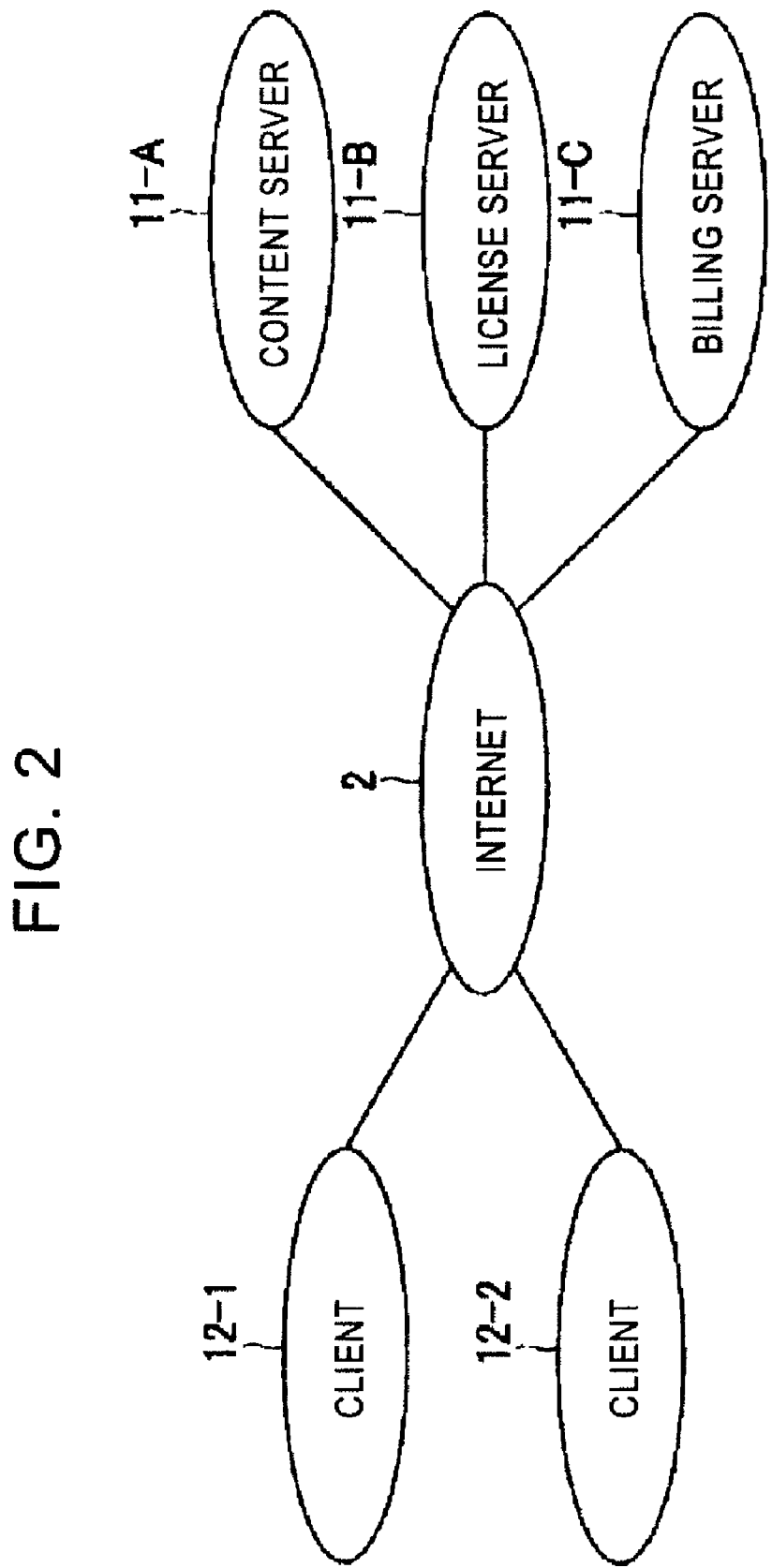
FIG. 2 is a configuration diagram showing the details of the content providing system according to the embodiment of the present invention.

FIG. 2 is a block diagram showing the detailed configuration of the content providing system 1. Clients 12-1 and 12-2 (hereinafter referred to simply as a client 12 if these clients need not be individually identified) are connected to the Internet 2. As described above, any number of clients may be connected to the Internet 2. A content server 11-A for providing content to the client 12, a license server 11-B for providing a license required for using the content provided by the content server 11-A to the client 12, and a billing server 11-C for billing the client 12 for the license received by the client 12 are also connected to the Internet 2.

Figure 3:
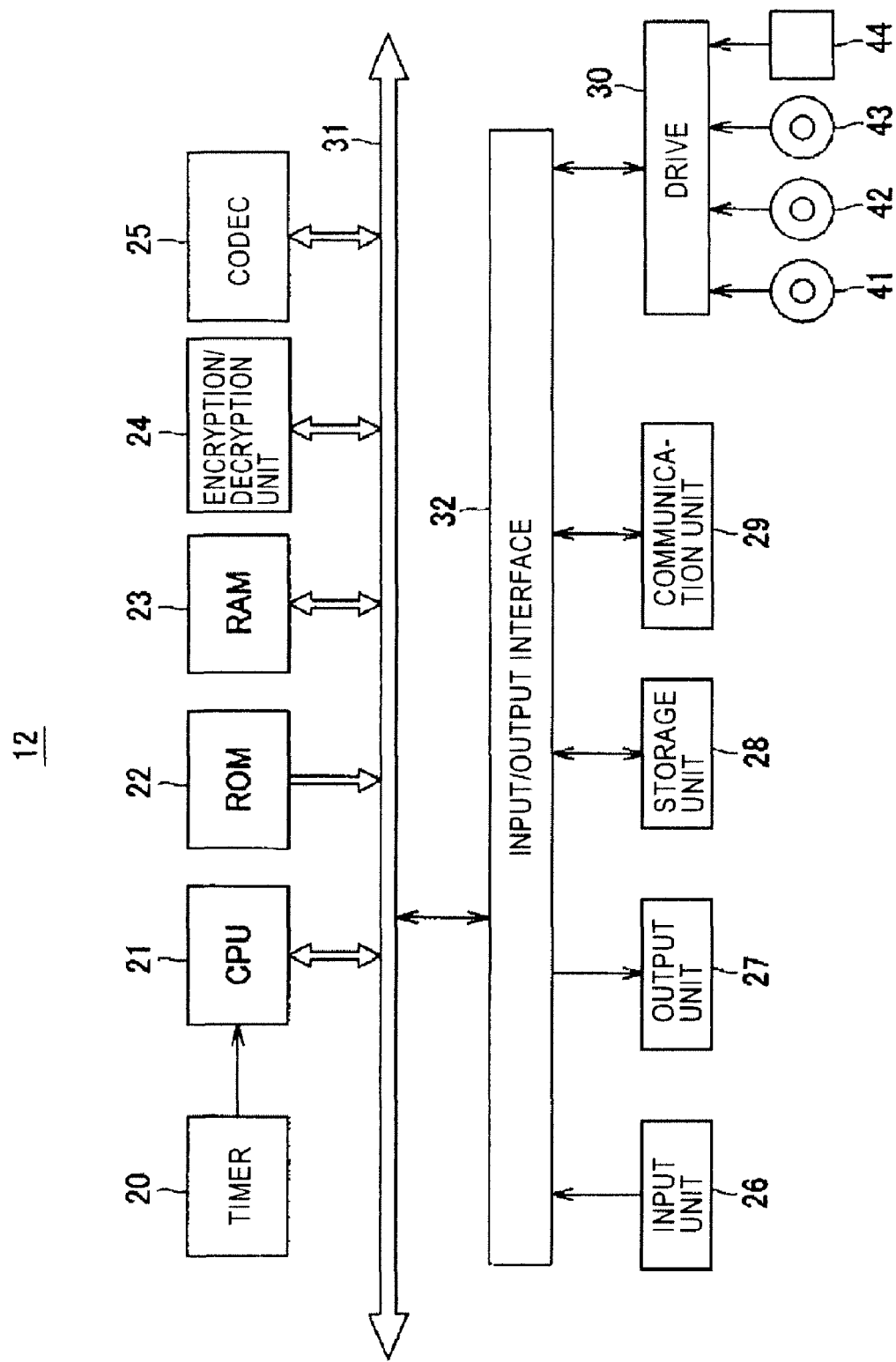
FIG. 3 is a block diagram of a client.

FIG. 3 is a block diagram showing the structure of the client 12. In FIG. 3, a central processing unit (CPU) 21 executes processing in accordance with a program stored in a read only memory (ROM) 22 or a program loaded from a storage unit 28 to a random access memory (RAM) 23. A timer 20 counts the time, and supplies time information to the CPU 21. The RAM 23 also stores data, etc., necessary for the CPU 21 to execute processing, as required.

An encryption/decryption unit 24 encrypts content data, and decrypts encrypted content data. A codec 25 encodes content data using a technique such as ATRAC3 (Adaptive Transform Acoustic Coding 3), and supplies the encoded data via an input/output interface 32 to a semiconductor memory 44 connected to a drive 30 for recording. The codec 25 also decodes encoded data read from the semiconductor memory 44 via the drive 30. The semiconductor memory 44 is commercially available as a memory card.

The CPU 21, the ROM 22, the RAM 23, the encryption/decryption unit 24, and the codec 25 are connected with one another via a bus 31. The input/output interface 32 is also connected to the bus 31.

The input/output interface 32 is connected to an input unit 26 including a keyboard and a mouse, an output unit 27 including a display, such as a cathode ray tube (CRT) or a liquid crystal display (LCD), and a speaker, the storage unit 28 including a hard disk, a communication unit 29 including a modem and a terminal adapter.

The communication unit 29 performs communication via the Internet 2, and transmits data supplied from the CPU 21. The communication unit 29 also outputs data received from a communicating party to the CPU 21, the RAM 23, and the storage unit 28. The storage unit 28 communicates with the CPU 21, and stores or deletes information. The communication unit 29 also communicates an analog or digital signal with another client.

The drive 30 is connected to the input/output interface 32, if necessary. A magnetic disk 41, an optical disk 42, a magneto-optical disk 43, the semiconductor memory 44, or the like is appropriately mounted to the drive 30, and a computer program read therefrom, such as a client module, is installed in the storage unit 28, as required.

The content server 11-A, the license server 11-B, and the billing server 11-C are also constituted by a computer having a similar basic structure to that of the client 12 shown in FIG. 3. In the following description, the structure shown in FIG. 3 is also referred to as the structure of the server 11.

Figure 4:
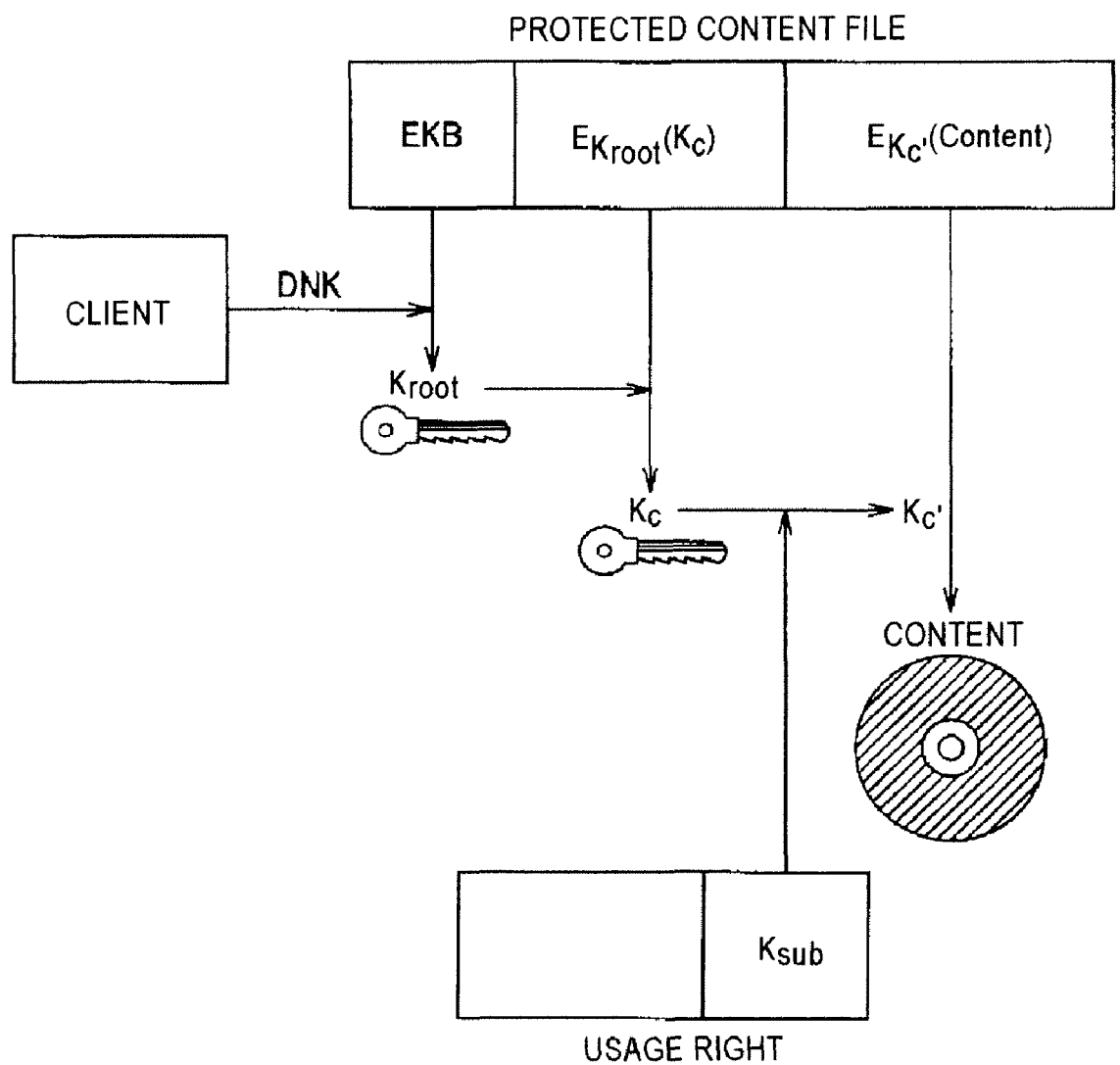
FIG. 4 is a diagram showing the relation between content and a license.

As shown in FIG. 4, content downloaded by the client 12 from the content server 11-A includes a content body and keys, and the content body is encrypted with keys. The client 12 decodes and plays back the content body based on the received content and license information.

In this embodiment, the client 12 is an information processing apparatus that is allowed to use the content under a range of conditions described in license information. The client 12 stores existing license information in the storage unit 28, and receives an updating module for updating the client module, new content, a rights information file for the new content, etc., via the communication unit 29. When the client module is updated and a new content usage function is added, the client 12 obtains updating license information, and is allowed to use the content under the conditions described in the existing license information and the updating license information.

Figure 5:
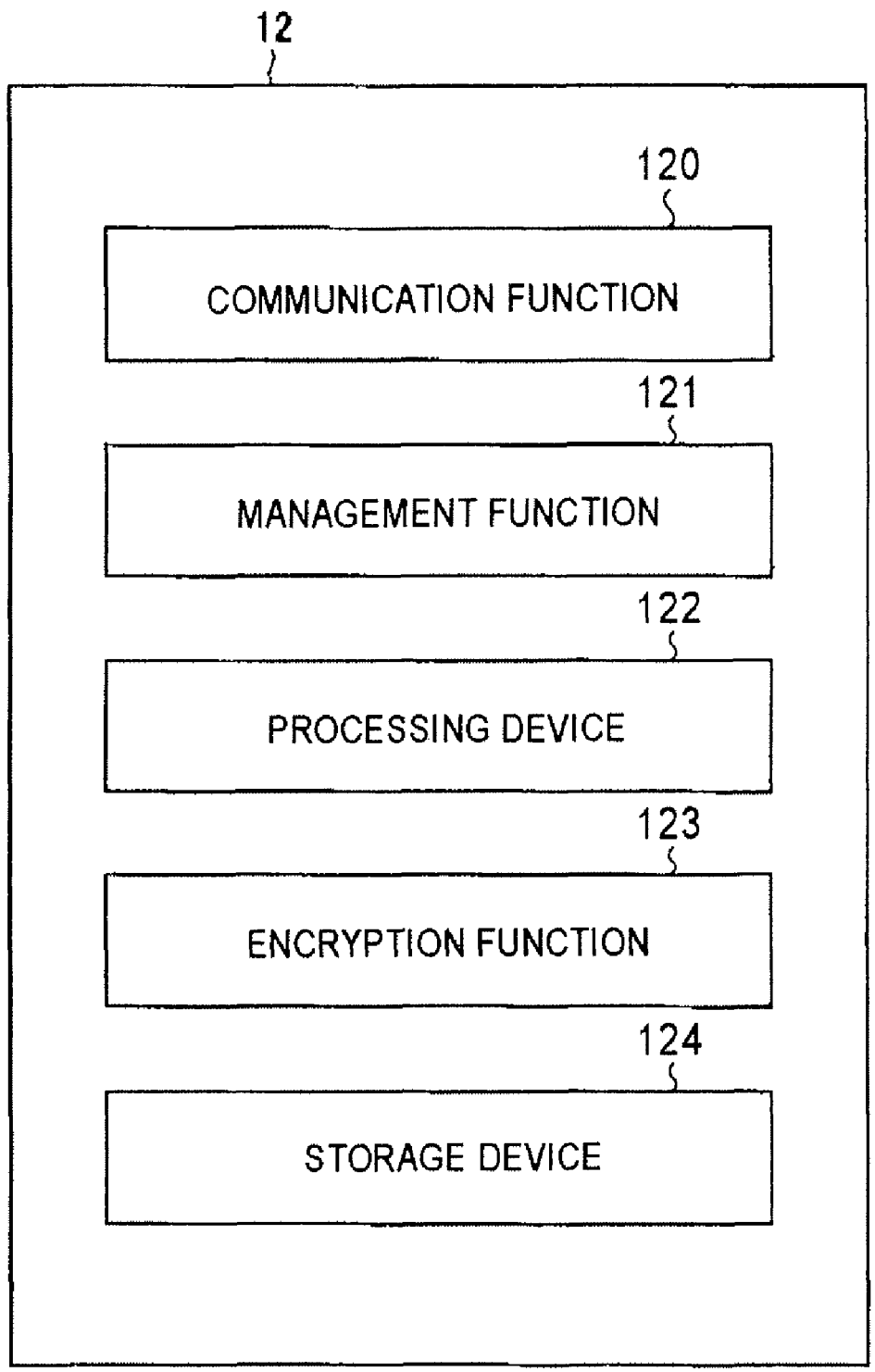
FIG. 5 is a functional block diagram of a client.

The client 12 functions as function blocks shown in FIG. 5 under the control of the CPU 21. A communication function 120 of the client 12 receives a message from the server 11, and passes the message to a management function 121. The communication function 120 also transmits a message received from the management function 121 to the server 11. An encryption function 123 encrypts and decrypts a message using a client private key shared with the server 11. The client private key is a private key in communication that is generated and shared by both parties during the communication. A processing device 122 generates and analyzes a message partially using the encryption function 123. A storage device 124 corresponds to the storage unit 28, and stores the existing license information. The storage device 124 also stores the license information updated by the server 11.

Figure 6:
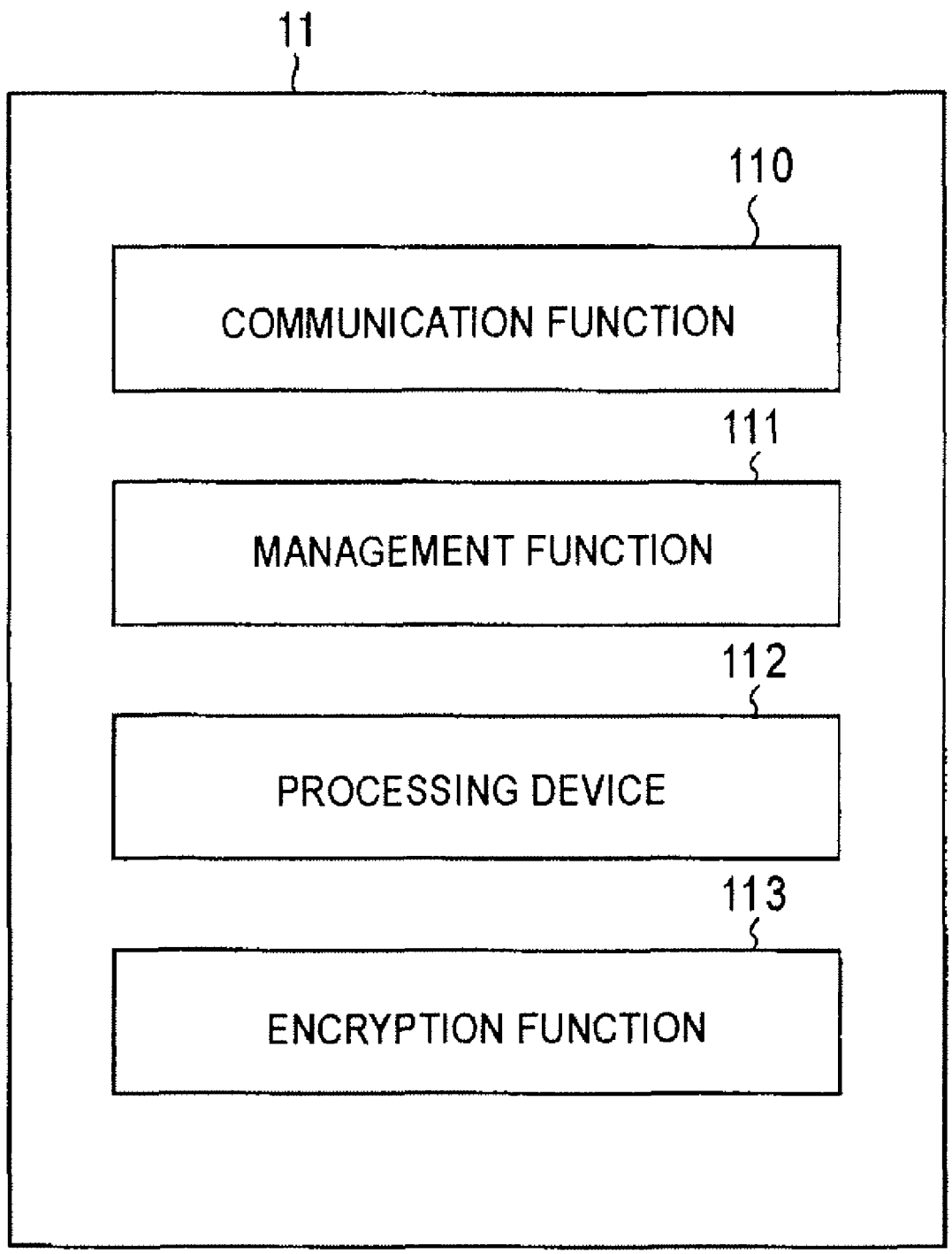
FIG. 6 is a functional block diagram of a server.

The server 11 functions in accordance with function blocks shown in FIG. 6 under the control of the CPU 21. A communication function 110 receives a message from the client 12, and passes the message to a management function 111. The communication function 110 also transmits a message received from the management function 111 to the client 12. An encryption function 113 encrypts and decrypts a message using the client private key shared with the client 12 or a private key owned only by the server 11. The management function 111 exchanges a message with the client 12 via the communication function 110, and appropriately processes the message. The management function 111 partially uses the encryption function 113 to generate and analyze a message. A processing device 112 performs processing requested by the management function 111.

FIG. 7 shows the simplified data structure of a rights information file including license information. The data structure of the rights information file is provided for each content item. A plurality of rights information files may be provided for each content item, or one rights information file may be provided for a plurality of content items.

As shown in FIG. 7, a rights information file includes "data name" and version information indicating which version of the client module the license information supports. The rights information file further includes "usage right type", "content ID (CID)", "usage right disjunction rules", "leaf ID" serving as a terminal ID, "device and media categories for check out" indicating categories of checkout terminals and media, "check out max count" indicating the maximum number of checkouts allowed, "device and media categories for copy" indicating categories of copiable terminals and media, and "copy out max count" indicating the maximum number of copies allowed. The rights information file further includes "AT3CD burn max count" indicating the maximum number of times the content can be duplicated to CDs by ATRAC3, "start_time" indicating the absolute start time, "end_time" indicating the absolute end time, and "period_time" indicating the relative period of time. A single rights information file may or may not include all pieces of information noted above, or may include any piece of or a plurality of pieces of information of the above-noted information. In a rights information file having a plurality of pieces of information, for example, a flag for specifying a PD to which the content can be checked out is associated with number-of-checkouts information that specifies the number of checkouts allowed, as described below.

The version information is associated with a version of the client module. The rights information file includes a permission condition and a usage condition for a content usage function of the version of the client module associated with the version information. When the latest version of the client module is released, the license server 11-B issues a rights information file for the latest version of the client module.

The content ID is an identification code for identifying the content associated with this rights information file. The same ID, i.e., the identification code for identifying the rights information file associated with the content is also described in a content file. The ID is signed to prevent tampering.

The "usage right disjunction rules" are independent rules that can be set by turning on or off flags. Several independent conditions are specified in this field. For example, this field has four bytes. Specifically, bit 0 may be assigned to a flag for determining whether or not the bit rate is converted, and the remaining bits 1 to 31 are reserved for later rule flags.

The "leaf ID" is an identification number of each device.

The "device and media categories for check out" specifies devices and media to which the content can be checked out from the client 12, and indicates a permission condition for permitting checkout, as described above. The term checkout means transferring content from a client to a portable device (PD). The "device and media categories for check out" is therefore a flag indicating a portable device to which the content can be transferred from the client 12. For example, three categories are defined: a network-based Mini Disk (MD) recording and playback device capable of recording music data over the Internet, a timer-equipped portable device, and a portable device without a timer. If flag "1"

indicates checkout allowed, "110" indicates that the PDs to which the content can be transferred from the client 12 are a network-based MD recording and playback device and a timer-equipped portable device while the content cannot be checked out to a portable device without a timer. The term check-in means that content checked out from a client to a PD is returned to the client from the PD. The content that was checked out from a client to a PD may be returned to the client by check-in, and may be then checked out.

The "check out max count" specifies the maximum number of times the content can be checked out to a portable device designated by the "device and media categories for check out", and indicates a checkout usage condition.

The "device and media categories for copy" specifies devices and media to which the content can be copied from the client 12, and indicates a permission condition for permitting copying. The term copying means duplicating content from a client to a portable device (PD). The "device and media categories for copy" is therefore a flag indicating a portable device to which the content can be duplicated from the client 12. For example, as in the "device and media categories for check out", three categories are defined: a network-based MD recording and playback device, a timer-equipped portable device, and a portable device without a timer. If flag "1" indicates copying allowed, "110" indicates that the PDs to which the content can be copied from the client 12 are a network-based MD recording and playback device and a timer-equipped portable device while copying to a portable device without a timer is prohibited.

The "copy out max count" specifies the maximum number of times the content can be copied to a portable device designated by the "device and media categories for copy", and indicates a copying usage condition.

The "AT3CD burn max count" specifies the maximum number of times the content can be duplicated to CDs by ATRAC3 codec, and indicates a usage condition for the function of duplicating the content to CDs.

The absolute start time "start_time" indicates the absolute time from which the content can be used, and the absolute end time "end_time" indicates the absolute time until which the content can be used. The absolute period of time during which the content can be used is specified by the "start_time" and the "end_time".

The relative period of time "period_time" indicates how long the content can be used from a designated time.

The above-noted information may be classified into information that specifies a period of time, information that specifies flags, and information that specifies the number of times. The "start_time", the "end_time", and the "period_time" may be classified as the information that specifies a period of time. The "usage right disjunction rules", the "device and media categories for check out", and the "device and media categories for copy" may be classified as the information that specifies flags. The "check out max count", the "copy out max count", and the "AT3CD burn max count" may be classified as the information that specifies the number of times.

The operation for updating the client module in the content providing system 1 will be described in detail.

Figure 8:
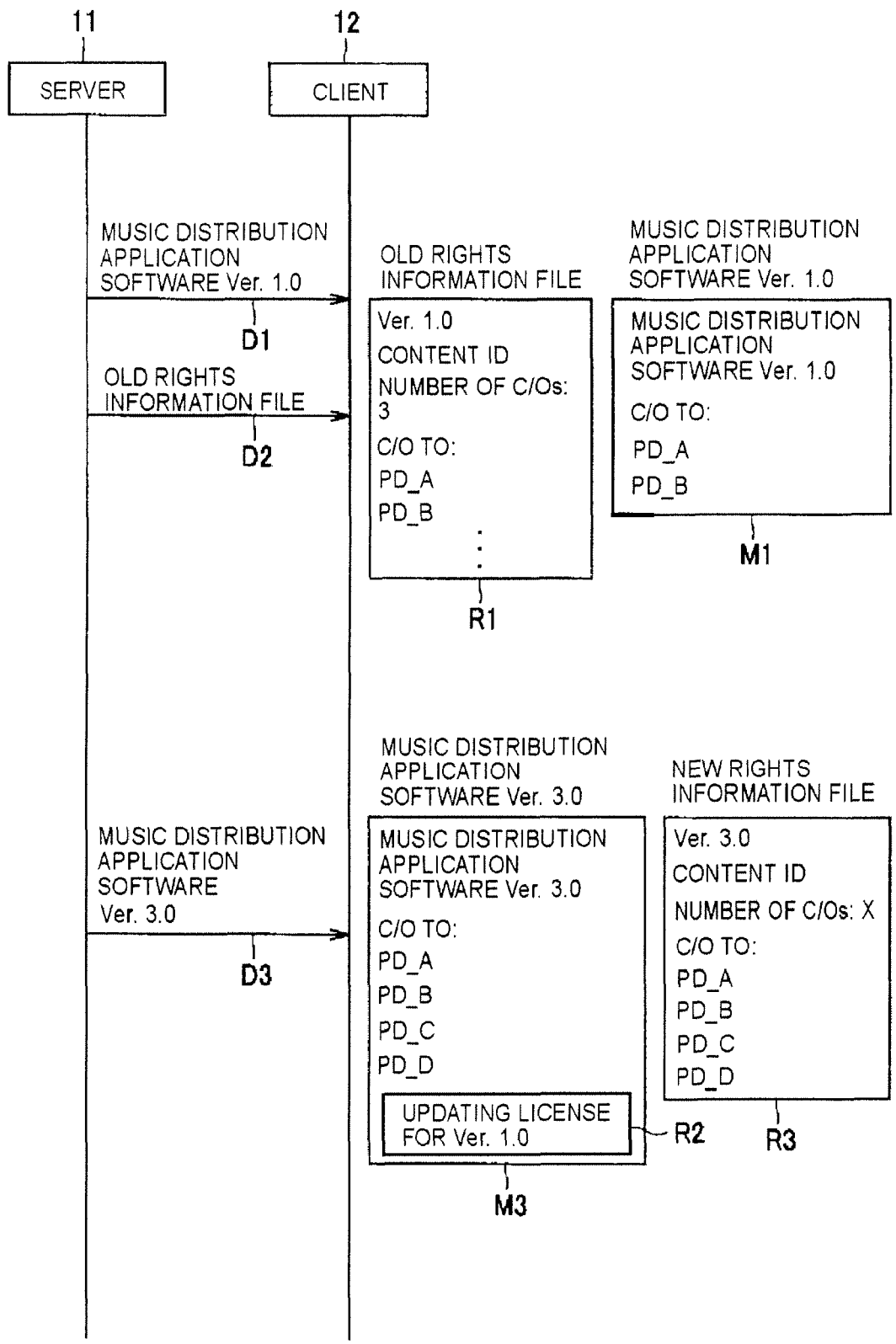
FIG. 8 is a chart showing the processing flow of data exchanged between a server 11 and a client 12 in the content providing system according to the embodiment of the present invention.

FIG. 8 is a chart showing the flow of data exchanged between the server 11 and the client 12. In FIG. 8, the client module is music distribution application software distributed similarly to content from the server 11. This application software may not be downloaded from the server 11, but a recording medium including the application software may be distributed free of charge or on payment. Alternatively, a recording medium including the music distribution application software and content and/or a license may be distributed free of charge or on payment. For ease of illustration, the license information shown in FIGS. 8 and 9 includes permission conditions for permitting checkout to other PDs, and usage conditions for three checkouts allowed, by way of example. In the license information, a permission condition for permitting checkout is defined for each checkout-allowed PD, and the number of checkouts allowed is defined as a common usage condition for the PDs. As described above, the content usage function is not limited to the checkout function.

The client 12 downloads the content from the server 11 using the service data described above. The client 12 may obtain the license information before downloading the content, or may obtain the content and the license information at the same time.

As shown in FIG. 8, the client 12 downloads (D1) music distribution application software (ver. 1.0) M1, which is a module for using the content, and obtains (D2) a rights information file R1 that stores a license of the content from the server 11 by a method described below. The rights information file R1 is associated with the music distribution application software (ver. 1.0) M1.

The rights information file R1 transmitted from the server 11 to the client 12 includes permission conditions and usage conditions complying with the specification, and version information. In the rights information file R1 shown in FIG. 8, the version information describes version 1.0, and the permission conditions include checkout (C/O) devices (PD_A and PD_B) to which the content can be checked out. The usage condition indicates three checkouts allowed.

In the client 12, particular usage conditions of the content identified by the content ID are permitted by the rights information file R1. In this example, the client 12 is allowed to check out the content to the device PD_A or PD_B up to three times. The devices PD_A and PD_B may be portable disk playback devices. As described above, the rights information file R1 includes not only the type of checkout device but also the time until which the content can be played back, the number of times the content can be played back, the number of times the content can be copied to media such as CDs, the number of times the content can be checked out to PDs, etc.

When a new version of the client module including an additional new function is sold or distributed, and the music distribution application software (ver. 1.0) M1 is appropriately updatable, a new rights information file associated with the new function is defined, and the version information in the new rights information file is defined. Version 1.0 of the client module is hereinafter referred to as an old client module, and the rights information file R1 is hereinafter referred to as an old rights information file.

For example, the old client module is updated to a new version (ver. 3.0) of the client module, and new checkout devices PD_C and PD_D are added. A client module including the new functions is hereinafter referred to as a new client module.

The new client module is distributed by, for example, a content provider. When the user who has the old rights information file R1 having the old version information (ver. 1.0) desires to enjoy the new functions, updating license information including permission conditions for the new functions is distributed together with the new client module. The updating license information includes version information (target-version information) indicating the old license information to be updated, and the target-version information identifies which version of the client module the updating license information supports.

The new client module (or updating module) for updating the old client module includes internal rights information, that is, updating license information including the target-version information, which allows the user to utilize the new function added to the target version of the client module. When the old rights information file (or old license information) is processed by the client 12, the new client module and the updating license information are also processed. Thus, the new functions that are not included in the old rights information file are utilized to use the content.

In this way, when the client module is updated and a new function is added, updating license information including permission conditions for the new function is obtained. Therefore, the new function that is not included in the old rights information file can be utilized while applying the usage conditions in the old rights information file.

Specifically, in FIG. 8, the client 12 downloads (D3) an updated version (ver. 3.0) of the music distribution application software M3 having new functions. The new client module M3 serves to update the old client module M1. The new version (ver. 3.0) of the music distribution application software M3 supports new checkout functions to devices PD_C and PD_D, which is not supported by the old version (ver. 1.0) of the music distribution application software M1.

When the new functions are to be utilized, generally, a rights information file R3 associated with the latest version, i.e., ver. 3.0, of the client module is required. The rights information file R3 includes permission conditions for all functions available in the latest version of the client module.

In this embodiment, however, the new version, i.e., ver. 3.0, of the client module M3 includes updating license information R2 for granting permission of the new functions to the old version (ver. 1.0) of the client module M1. The updating license information R2 includes target-version information that identifies the target version, i.e., ver. 1.0.

The new client module M3, i.e., version 3.0 of the music distribution application software, reads the version information (ver. 1.0) of the old rights information file R1, and processes the read version information and the updating license information R2. Thus, the new checkout functions to the devices PD_C and PD_D, which are not included in the license information R1 of the old client module (ver. 1.0), are permitted. The client 12 is therefore allowed to check out the content to the devices PD_A, PD_B, PD_C, and PD_D up to three times that are defined as the usage condition in the usage condition in the old rights information file R1.

Therefore, once the client 12 having the old rights information file R1 updates the music distribution application software to ver. 3.0, the new permission conditions are automatically offered. Thus, the client 12 can utilize the functions while still applying the usage condition in the old rights information file R1.

In a case where checkout devices are described as free-of-charge options, when a new checkout device is added as a new function, an old rights information file does not generally support this new function. However, a new version of the music distribution application software that stores updating license information for permitting checkout to the added checkout device allows the client 12 having the old rights information file to utilize the new function. In this example, the updating license information is stored in a new version of the client module. However, an updating license itself may be distributed.

As one application of the system described above, a plurality of previous versions of rights information files may be associated with different internal rights information files, and different functions may be added to individual pieces of version information.

Figure 9:
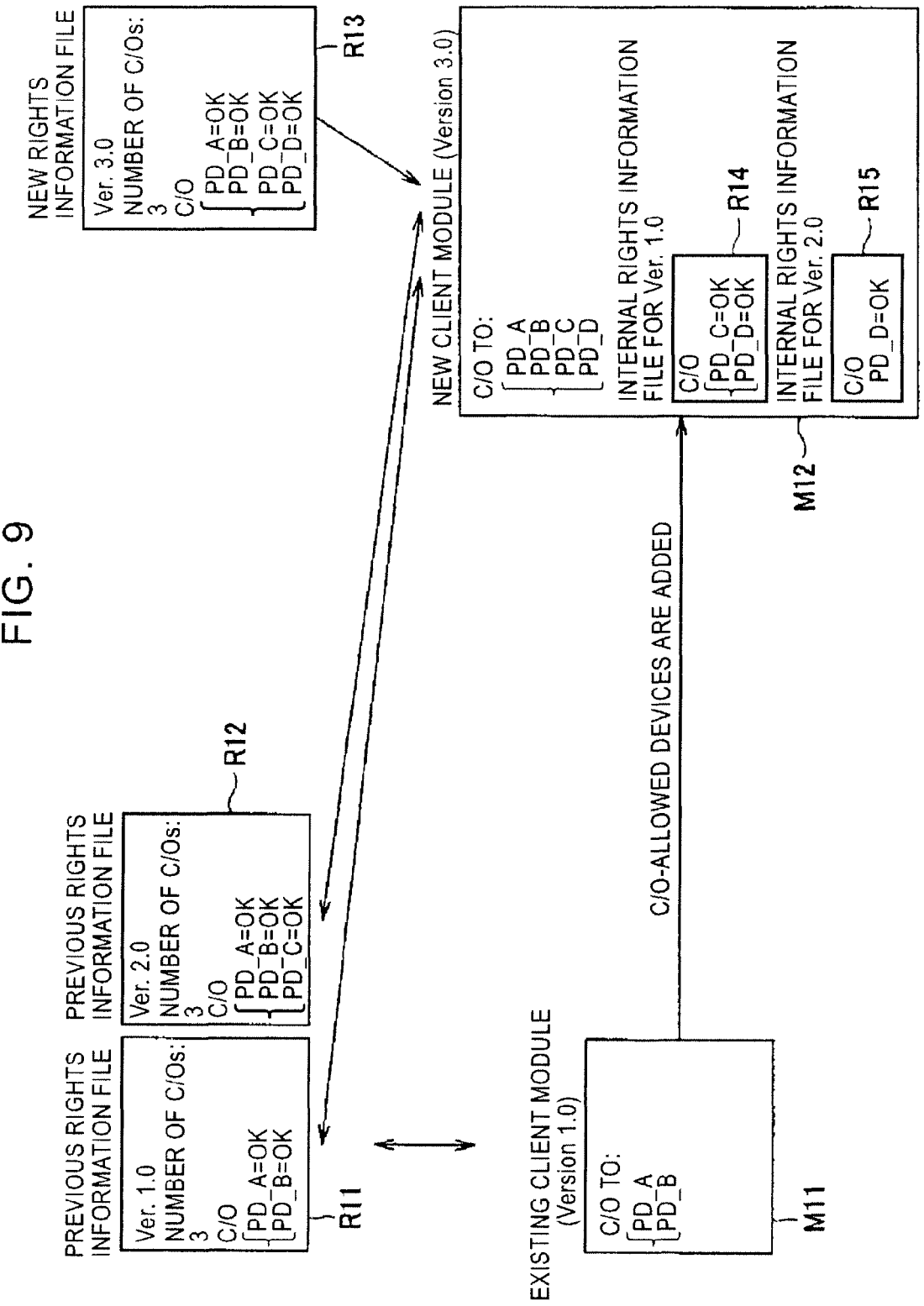
FIG. 9 is a diagram showing the relation between several versions of a rights information file and versions of a client module.

For example, clients have two previous versions, e.g., ver. 1.0 and ver. 2.0, of rights information files (hereinafter referred to as previous rights information files), and a new function is added by the latest version, e.g., ver. 3.0, of the client module. FIG. 9 shows the relationship between these versions of the rights information files and the client module. In FIG. 9, three checkouts are defined as a usage condition in the previous rights information files R11 and R12 and a new rights information file R13. A desired usage condition, such as a desired number of checkouts allowed, may be purchased by a client.

As shown in FIG. 9, a client module (existing client module) M11 installed in the client 12 has ver. 1.0, and has two checkout usage functions to checkout devices PD_A and PD_B. The devices PD_A and PD_B may be portable devices.

The existing client module (ver. 1.0) M11 is updated to a new client module (ver. 3.0) M12. The new client module M12 has four checkout usage functions to checkout devices PD_A, PD_B, PD_C, and PD_D. The devices PD_C and PD_D may be PDAs, car stereo systems, or the like.

The previous rights information file R11 associated with the existing client module (ver. 1.0) M11 includes version information (ver. 1.0) indicating the version (ver. 1.0) of the existing client module M11, and permission conditions (PD_A=OK and PD_B=OK) for the two usage functions of the existing client module (ver. 1.0) M11. The previous rights information file R12 associated with version 2.0 of the client module (not shown) includes version information (ver. 2.0) indicating the version (ver. 2.0) of the client module, and permission conditions (PD_A=OK, PD_B=OK, and PD_C=OK) for the three usage functions of version 2.0 of the client module. The new rights information file R13 associated with the new client module (ver. 3.0) M12 includes version information (ver. 3.0) indicating the version (ver. 3.0) of the new client module M12, and permission conditions (PD_A=OK, PD_B=OK, PD_C=OK, and PD_D=OK) for the four usage functions of the new client module (ver. 3.0) M12.

The new client module (ver. 3.0) M12 includes the four usage functions, and internal rights information files (updating license information) R14 and R15 for previous versions of the license information. The internal rights information files R14 and R15 include permission conditions for the usage functions that are not included in the previous rights information files R11 and R12.

The internal rights information file R14 stores updating license information for ver. 1.0 of the client module, and includes permission information that is not included in the version-1.0 rights information file R11, i.e., permission conditions for checkout to the devices PD_C and PD_D. The internal rights information file R15 stores updating license information for ver. 2.0 of the client module, and includes permission information that is not included in the version-2.0 rights information file R12, i.e., permission conditions for checkout to the device PD_D.

The existing client modules are updated using the new client module (ver. 3.0) M12. Thus, using the internal rights information file R14, a user having the rights information file R11 associated with, for example, ver. 1.0 of the client module is allowed to utilize the added new checkout functions to the devices PD_C and PD_D under the usage condition (three checkouts allowed) in the previous rights information file R11. A client having the rights information R12 associated with ver. 2.0 of the client module (not shown) is allowed to utilize the added new checkout function to the device PD_D using the internal rights information file R15.

Therefore, a rights information file has version information associated with each version of the client module. The internal rights information files (updating rights information files) R14 and R15 have target-version information for providing permission conditions for a new usage function of an updated version of the client module, which is an additional difference usage function. The user need not obtain updated license information, e.g., the new license information R13, each time the client module is updated, and can utilize the new function using an old rights information file.

In this embodiment, a client module has a version number according to a usage function available in each version of the client module. License information includes version information indicating the version of the client module, and condition information including a permission condition and a usage condition for a usage function available in this version of the client module. Moreover, updating license information includes additional condition information including a permission condition for a new usage function of an updated version of the client module, and target-version information indicating a previous version of the client module that requires the additional condition information. The updating license information is stored in an updating module (a new client module) for updating the client module, so that the updating license information can be obtained at the same time when the client module is updated. The new client module allows the user to use the content under the usage conditions in the old license information using the new usage function.

In this case, the new client module checks the version information of the old license information, and obtains updating license information having the target-version information matched to the checked version information. Then, the client module processes the updating license information and the old license information. Thus, the user is allowed to use the content under the conditions defined in the updating license information and the old license information.

Due to the target-version information of the updating license information, if a plurality of versions of licenses are released, the desired updating license information can be selected. If the client module is updated a plurality of times, a user need not obtain new license information, and can use the content based on a new function under the old license information.

The license server 11-B need not update users' license information each time the client module is updated. Thus, the load placed on the server 11 for updating the client module can be reduced.

In the illustrated embodiment, updating license information includes a permission condition, e.g., a checkout permission condition, for a new usage function for the content, and the content is used under a usage condition, e.g., the number of checkouts allowed, which is included in old license information. The present invention is not limited to this form. For example, when the client module is updated, for example, one-time checkout (usage condition) may be applied to an available new function. In order to promote updating of the client module, for example, a client that updated the client module may be allowed to utilize a new function or an existing function for a certain period of time, or may be allowed to play back particular content free of charge a predetermined number of times or free of charge for a certain period of time.

The information processing apparatus of the present invention, serving as a client, may be a personal computer, a personal digital assistant (PDA), a portable telephone, a game terminal, or the like.

If the series of processes is implemented by software, a program constituting the software is installed into a computer incorporated in special-purpose hardware or a general-purpose personal computer capable of executing various functions by installing various programs from a network or a recording medium.

The recording medium may be a packaged medium separate from the apparatus for providing the program to a user, such as, as shown in FIG. 3, the magnetic disk 41 (including a floppy disk), the optical disk 42 (including a CD-ROM (Compact Disk-Read Only Memory) and a DVD (Digital Versatile Disk)), the magneto-optical disk 43 (including an MD (Mini-Disk)), or the semiconductor memory 44, in which the program is recorded, or a device offered to a user as built-in form in the apparatus, such as the ROM 22 having the program, or a hard disk included in the storage unit 28.

In this document, the term system means the overall apparatus constituted by a plurality of devices.

What is claimed is:

1. A data communication system, comprising:
a communication terminal; and
a server connected with the communication terminal via a network, the server comprising a server communication unit that issues updating license information to the communication terminal, the updating license information including condition information for at least one usage function to use content,
the communication terminal comprising
a client module that obtains license information, and
a processing device that uses the content under condition information defined in the license information, wherein,
when the client module is updated by an updating module to add the at least one usage function and the condition information defined in the license information does not include the condition information for the at least one usage function, the server communication unit issues the updating license information including the condition information for the at least one usage function, and
the client module reads a version indicator of the license information, obtains the updating license information, based on the version indicator of the license information, and uses the content under both the condition information defined in the updating license information for the at least one usage function and the condition information defined in the license information.

2. The system according to claim 1, wherein the server transmits the updating module to the communication terminal.

3. The system according to claim 1, wherein the client module has a version number according to a usage function that can be used in the client module, and the license information includes version information indicating a version of the client module, and condition information for the usage function that can be used in the version of the client module.

4. The system according to claim 1, wherein the updating license information includes additional condition information for the at least one usage function, and target-version information specifying a version of the client module that requires the additional condition information.

5. The system according to claim 1, wherein the condition information defined in the license information includes a permission condition for permitting a use of a usage function, and a usage condition for the usage function, and the updating license information specifies a permission condition for permitting a use of the at least one usage function.

6. A data communication method for communicating data between a communication terminal and a server connected with the communication terminal via a network, the data communication method comprising:

issuing updating license information from the server to the communication terminal, the updating license information including condition information for at least one usage function to use content;

obtaining license information in the communication terminal; and using the content in a client module of the communication terminal under condition information defined in the license information, wherein when the client module is updated by an updating module to add at least one usage function and the condition information defined in the license information obtained in the obtaining does not include the condition information for the at least one usage function, the issuing issues the updating license information including the condition information for the at least one usage function, and the using includes checking a version indicator of the license information, obtaining the updating license information, based on the version indicator of the license information, and using the content under both the condition information defined in the updating license information for the at least one usage function and the condition information defined in the license information.

7. A computer-readable, non-transitory storage medium encoded with computer executable instructions, wherein the instructions, when executed by a processing device, cause the processing device to perform a method comprising:

receiving updating license information including condition information for a usage function to use content, when a client module executable by the processing device is updated by an updating module to add the usage function and condition information defined in license information does not include the condition information for the usage function;

checking a version indicator of the license information;

obtaining the updating license information, based on the version indicator of the license information; and using the content under both the condition information included in the updating license information for the usage function and the condition information defined in the license information.

8. The system according to claim 1, wherein, when the client module is updated by the updating module to add the at least one usage function, a version of the client module is updated from a previous version to an updated version, the version indicator of the license information indicating the previous version, the updating license information indicating the previous version.

* * * * *